US012091528B2

(12) United States Patent
Okabe et al.

(10) Patent No.: US 12,091,528 B2
(45) Date of Patent: Sep. 17, 2024

(54) SPHERICAL SILICA POWDER

(71) Applicant: DENKA COMPANY LIMITED, Tokyo (JP)

(72) Inventors: Takuto Okabe, Machida (JP); Motoharu Fukazawa, Machida (JP)

(73) Assignee: DENKA COMPANY LIMITED, Tokyo (JP)

( * ) Notice: Subject to any disclaimer, the term of this patent is extended or adjusted under 35 U.S.C. 154(b) by 527 days.

(21) Appl. No.: 17/436,013

(22) PCT Filed: Jan. 30, 2020

(86) PCT No.: PCT/JP2020/004443
§ 371 (c)(1),
(2) Date: Sep. 2, 2021

(87) PCT Pub. No.: WO2020/195205
PCT Pub. Date: Oct. 1, 2020

(65) Prior Publication Data
US 2022/0169832 A1  Jun. 2, 2022

(30) Foreign Application Priority Data

Mar. 26, 2019  (JP) .................... 2019-057610
Jun. 25, 2019  (JP) .................... 2019-117216

(51) Int. Cl.
*C01B 33/18* (2006.01)
*B65B 1/04* (2006.01)
*C08K 3/36* (2006.01)
*C08K 7/18* (2006.01)
*C08K 9/06* (2006.01)
*H01B 3/12* (2006.01)

(52) U.S. Cl.
CPC ............... *C08K 7/18* (2013.01); *B65B 1/04* (2013.01); *C01B 33/18* (2013.01); *C08K 9/06* (2013.01); *C01B 33/181* (2013.01); *C01P 2004/32* (2013.01); *C08K 3/36* (2013.01); *H01B 3/12* (2013.01)

(58) Field of Classification Search
None
See application file for complete search history.

(56) References Cited

U.S. PATENT DOCUMENTS

| | | | |
|---|---|---|---|
| 4,923,520 A | 5/1990 | Anzai et al. | |
| 2005/0238867 A1* | 10/2005 | Nakano | C08K 5/0075 428/317.9 |
| 2012/0123021 A1 | 5/2012 | Yano et al. | |
| 2013/0030082 A1 | 1/2013 | Tsujimoto et al. | |

FOREIGN PATENT DOCUMENTS

| | | | |
|---|---|---|---|
| CN | 102471590 A | 5/2012 | |
| JP | S58-138740 A | 8/1983 | |
| JP | 2003-165718 A | 6/2003 | |
| JP | 2004-189577 A | 7/2004 | |
| JP | 2004-311326 A | 11/2004 | |
| JP | 2005-022915 A | 1/2005 | |
| JP | 2005-054129 A | 3/2005 | |
| JP | 2008-162849 A | 7/2008 | |
| JP | 2010-222147 A | 10/2010 | |
| JP | 2011-219429 A | 11/2011 | |
| JP | 2012-136363 A | 7/2012 | |
| JP | 2013-528558 A | 7/2013 | |
| JP | 2014-024916 A | 2/2014 | |
| JP | 2015-189638 A | 11/2015 | |
| JP | 2016-052953 A | 4/2016 | |
| JP | 2016-121044 A | 7/2016 | |
| JP | 2017-179346 A | 10/2017 | |
| JP | 2018-145037 A | 9/2018 | |
| JP | 2019-019222 A | 2/2019 | |
| WO | WO-2011136452 A1 * | 11/2011 | ............. C01B 33/18 |

OTHER PUBLICATIONS

Sebastian et al., "Low-loss dielectric ceramic materials and their properties," International Materials Reviews, 2015, vol. 60 No. 7, pp. 392-412 with 245 pages, of Supplementary data.
Huang et al., "Effect of Nanoparticle Surface Treatment on Morphology, Electrical and Water Treeing Behavior of LLDPE Composites," IEEE Transactions on Dielectrics and Electrical Insulation, vol. 17, No. 6, (2010), pp. 1697-1704.
Apr. 14, 2020 International Search Report issued in International Patent Application No. PCT/JP2020/004443.
Product catalogue of Heart-dissipation fillers for Electrical materials, Showa Denko, 2013.
Yoshinobu Urabe, Crystal Structure of Silicon Dioxide.
Aug. 27, 2020 Written Argument filed in Japanese Patent Application No. 2020-512631.
Yusuke Imai. "Ceramics Fillers in Dielectric Compositions for High Frequency Applications," The Micromeritics, No. 58, 2015, pp. 22-27.
Ken-Ichi Miyata. "Water vapor adsorption characteristics of heat-treated fine powdered silica," J-Stage, 1965.
Jiae Lee et al., "Filler effect of low loss dielectricity in printed circuit board material," Journal of Electroceramics, 23 (2009), 141-145.

(Continued)

*Primary Examiner* — Richard A. Huhn
(74) *Attorney, Agent, or Firm* — Oliff PLC

(57) ABSTRACT

A spherical silica powder with a low dielectric tangent, wherein after formulating the spherical silica powder in a resin and molding it into a sheet, in a dielectric tangent of the spherical silica powder calculated by using the following Formula (I) based on a dielectric tangent (tan δc) of the sheet which is measured under the conditions a frequency is 35-40 GHz with a resonator method, B/A is 0.70 or lower, wherein "A" represents a dielectric tangent (tan $\delta f_A$) of the spherical silica powder before a dielectric tangent reduction treatment and "B" represents a dielectric tangent (tan $\delta f_B$) of the spherical silica powder after a dielectric tangent reduction treatment; and a specific surface area of said spherical silica powder after a dielectric tangent reduction treatment is 1-30 $m^2/g$.

7 Claims, No Drawings

(56) References Cited

OTHER PUBLICATIONS

Sep. 28, 2021 International Preliminary Report on Patentability issued in PCT Application No. PCT/JP2020/004443.
Jun. 29, 2023 Office Action issued in Chinese Patent Application No. 202080023678.5.

* cited by examiner

SPHERICAL SILICA POWDER

TECHNICAL FIELD

The present invention relates to spherical silica powder having a low dielectric tangent.

BACKGROUND ART

Recently, with increasing the amount of information communication in the communication field, the used of a frequency band is expanding in electric devices and communication devices. A high frequency is characterized by wide bandwidth, straightness, permeability and the like, and in particular, a GHz band with a frequency of $10^9$ or higher is extensively used. For example, in an automobile field, a millimeter-wave radar and quasi-millimeter-wave radar installed for collision prevention purpose use high frequencies of 76-79 GHz, 24 GHz, respectively. It is expected that it will become more widespread in the future.

With applying a high frequency band, a problem arises that the transmission loss of the circuit signal becomes large. Transmission loss generally comprised of conductor loss due to the skin effect of wiring, and dielectric loss due to properties of the dielectric material of insulators constituting electric and electronic components such as substrate. Since the dielectric loss is proportional to a frequency to the first power, a dielectric constant to the ½ power and a dielectric tangent to the first power, both a dielectric constant and a dielectric tangent are required to be low for materials used in devices for a high frequency band.

Polymer materials used for insulator materials have generally low dielectric constant and many of them have high dielectric tangent. On the other hand, many of ceramic materials have the opposite characteristics. In order to balance both the characteristics, ceramic filler-filled polymer materials are being considered (Patent document 1).

Dielectric characteristics of ceramic materials with a GHz band have been known, for example by Non-patent document 1 and the like and all of the characteristics are those for a sintered substrate. Silica ($SiO_2$) has a small dielectric constant (3.7), a quality coefficient index Qf (a value obtained by multiplying the reciprocal of a dielectric tangent by the observed frequency) is about 120,000 and, therefore, it is promising as a material for fillers having a low dielectric constant and a dielectric tangent. In addition, in order to facilitate formulation in resin, it is preferable that the filler shape is closer to a spherical shape. Since spherical silica can be easily synthesized (e.g., Patent document 2), it has been used in a variety of applications. Therefore, it is expected to be widely used in a high frequency band dielectric device.

However, on a surface of a spherical silica particle, there are a lot of adsorbed water and polar functional groups such as a silanol group and the like. In particular, there exists a problem that a dielectric tangent deteriorates from that of a sintered substrate.

As a method for reducing adsorbed water and polar functional groups on the surface of filler particles, for example, Non-patent document 2 discusses a method of surface treatment with a silane coupling agent. However, at 1-10 MHz, the dielectric tangent is hardly reduced, the effect is insufficient and an effect in the GHz band is not explicitly described.

RELATED DOCUMENT

Patent Document

[Patent Document 1] JP 2014-24916A
[Patent Document 2] JP S58-138740A

Non-Patent Document

[Non-patent Document 1] International Materials Reviews Vol. 60, No. 70, Supplementary data (2015)
[Non-patent Document 2] IEEE Transactions on Dielectrics and Electrical Insulation Vol. 17, No. 6 (2010)

DISCLOSURE OF THE INVENTION

Problem to be Solved by the Invention

The present invention provides spherical silica powder having a low dielectric tangent.

Means for Solving the Problem (1) Spherical silica powder, wherein after formulating the spherical silica powder in a resin and molding it into a sheet, in a dielectric tangent of the spherical silica powder calculated by using the following Formula (I) based on a dielectric tangent (tan δc) of the sheet which is measured under the conditions a frequency is 35-40 GHz with a resonator method, B/A is 0.70 or lower, wherein "A" represents a dielectric tangent (tan $\delta f_A$) of the spherical silica powder before a dielectric tangent reduction treatment and "B" represents a dielectric tangent (tan $\delta f_B$) of the spherical silica powder after a dielectric tangent reduction treatment; and a specific surface area of said spherical silica powder after a dielectric tangent reduction treatment is 1-30 $m^2/g$.

[Numerical formula 1]

$$\log(\tan \delta c) = Vf \cdot \log(\tan \delta f) + (1 - Vf) \cdot \log(\tan \delta r) \quad \text{Formula (I)}$$

wherein, in Formula (I), each of the symbols has the following meanings:
Vf; a volume fraction of the spherical silica powder in the sheet
tan δr; a dielectric tangent of a resin sheet (without filler formulation)

(2) The spherical silica powder of (1), wherein the dielectric tangent reduction treatment comprises:
heat treating a raw material spherical silica powder at a temperature of 500-1100° C. and for a predetermined time in which heating temperature (° C.)×heating time (h) becomes 1000-26400 (° C.·h).

(3) The spherical silica powder of (1) or (2), wherein the average circularity is 0.85 or higher.

(4) The spherical silica powder of any one of (1)-(3), which is surface treated with a surface treatment agent.

(5) The spherical silica powder of any one of (1)-(4), which is stored in a moisture-proof bag with a permeability of 0.1 ($g/m^2 \cdot 24$ h) or lower under the condition of B (Temperature 40° C.–Relative humidity 90%) defined by JIS Z 0208-1976.

(6) A resin sheet comprising the spherical silica powder of any one of (1)-(5).

(7) A method for storing the spherical silica powder of any one of (1)-(4) in a moisture-proof bag with a permeability of 0.1 (g/m²·24 h) or lower under the condition of B (Temperature 40° C.–Relative humidity 90%) defined by JIS Z 0208-1976.

Effects of the Invention

According to the present invention, spherical silica powder capable of lowering a dielectric tangent of a resin material such as a substrate may be provided.

MODE FOR CARRYING OUT THE INVENTION

Embodiments of the present invention will be explained below. However, the present invention is not limited within the following examples. The spherical silica powder of the present invention shows that B/A is 0.70 or lower, preferably 0.60 or lower, more preferably 0.40 or lower, wherein "A" represents a dielectric tangent (tan $\delta f_A$) of the spherical silica powder before a dielectric tangent reduction treatment and "B" represents a dielectric tangent (tan $\delta f_B$) of the spherical silica powder after a dielectric tangent reduction treatment. If B/A is higher than 0.70, the dielectric tangent reduction effect when formulating in a resin becomes small. The smaller the B/A, the greater the dielectric tangent reduction effect when formulating in a resin. The lower limit of the B/A is not specially defined, it is practically 0.01 or higher.

In the present invention, "tan $\delta f$" is a value calculated according to the compound rule of the following Formula (I), wherein after formulating the spherical silica powder in a resin and molding it into a sheet, based on a dielectric tangent (tan $\delta c$) of the sheet formulated in a resin and molded, which is measured under the conditions a frequency is 35 GHz with a cavity resonator method. The resin is not specially limited as far as a dielectric constant and dielectric tangent can be measured. In the present invention, polyethylene (PE) and polypropylene (PP) were used.

[Numerical formula 2]

$$\log(\tan\delta c) = Vf \cdot \log(\tan\delta f) + (1 - Vf) \cdot \log(\tan\delta r) \quad \text{Formula (I)}$$

wherein, in Formula (I), each of the symbols has the following meanings:
Vf; a volume fraction of the spherical silica powder in the sheet
tan $\delta r$; a dielectric tangent of a resin sheet (without filler formulation)

In addition, a reduction rate (%) of a dielectric tangent of the resin sheet itself is obtained by Formula (II), wherein "a" represents a dielectric tangent (tan $\delta c_a$) of a resin sheet, which is measured when a raw material spherical silica powder before a dielectric tangent reduction treatment is formulated in a resin, and "b" represents a dielectric tangent (tan $\delta c_b$) of the resin sheet, which is measured when a raw material spherical silica powder after a dielectric tangent reduction treatment is formulated in a resin.

[Numerical formula 3]

$$\{1 - (b/a)\} \times 100 \quad \text{Formula (II)}$$

The spherical silica powder of the present invention has a specific surface area of 1-30 m²/g. When the specific surface area is more than 30 m²/g, formulation in a resin becomes difficult, and when it is less than 1 m²/g, a dielectric tangent reduction treatment effect becomes small.

The spherical silica powder of the present invention has an average circularity of 0.85 or higher, preferably 0.90 or higher. When the average circularity is less than 0.85, upon mixed with a resin, the viscosity increases and the fluidity decreases, resulting in poor workability and fillability.

The spherical silica powder of the present invention has a density of, desirably 1.8-24 G/cm³. When the density is lower than 1.8, particles contain many voids in it, results in difficulty in mixing in a resin. When the density is higher than 2.4, a crystalline structure of silica contains α-quartz, cristobalite and the like, and, therefore, for example, there is a concern about an influence on physical properties such as an increase in the thermal expansion coefficient.

The raw material spherical silica powder for a dielectric tangent reduction treated spherical silica powder of the present invention can be desirably used when it is a spherical silica powder having an average circularity of 0.85 or higher, and a specific surface area of 1-30 m²/g. Methods for producing a raw material spherical silica powder include, for example, a powder melting method that allows spheroidization by passing powder through a high temperature range above a melting point of the powder.

The dielectric tangent reduction treated spherical silica powder of the present invention may be produced by high-temperature heat treating a raw spherical silica powder. It may be produced by treating a raw material spherical silica powder with hot air of in an electric furnace at a temperature of 500-1100° C. and for a predetermined time (e.g., about 15.2 hours), in which heating temperature (° C.)×heating time (h) becomes 1000-26400 (° C.·h), preferably for a predetermined time (e.g., about 2-35 hours), in which heating temperature (° C.)×heating time (h) becomes 1800-17600 (° C.·h). After allowing to cool it naturally in the electric furnace, collect the spherical silica powder under a condition of 110° C.-300° C. After cooling to in an environment with a humidity of 40% RH or less, it is stored at 15-25° C. and collected in a moisture proof aluminum bag.

By the above mentioned manufacturing method, it is possible to reduce the adsorbed water and polar functional groups on the surface of the spherical silica particle without changing powder properties such as specific surface area. It is expected that even after production, for example, when stored in high humidity for one month, the amounts of the adsorbed water and polar functional groups on the surface of the particle do not change enough to affect the increase in dielectric tangent (tan $\delta f$) of the spherical silica.

A production method may comprises a step of classifying powers so as to obtain desired specific surface area and average particle size. When a heating temperature is 500-1100° C., a specific surface area and an average particle size do not change before and after heating. Therefore, it is desirable that a classifying step is carried out before heating, and adjusting the specific surface area and average particle size to desirable ones, heat treatment is performed.

The obtained powder is surface treated with a surface treatment agent to further reduce surface polar groups and the dielectric tangent may be reduced. As a surface treatment agent, those polar functional groups are not easy to remain after surface treatment are preferable, such as hexamethyldisilazane and the like. It is desired that after surface treatment, they are collected again in a moisture proof aluminum bag.

As a storage method for the spherical silica powder of the present invention, whose dielectric tangent is reduced, it is preferable to store it by use of a moisture proof bag having a moisture permeability of 0.1 (g/m²·24 h) or lower under the condition B (Temperature 40° C.–Relative humidity 90%) according to JIS Z 0208-1976, such as a moisture proof aluminum bag and a PET/AL/PE laminate bag.

The spherical silica powder of the present invention and other powder having different specific surface area, average particle size, and compositions may be formulated and mixed to obtain a mixed powder. By making a mixed powder, a dielectric constant, a dielectric tangent, thermal expansion coefficient, thermal conductivity, filling rate and the like can be more easily adjusted when formulated with a resin.

The spherical silica powder of the present invention and its mixed power may be formulated, for example, in a resin. Examples of the resin may be used in the present invention include polyethylene, polypropylene, epoxy resin, silicone resin, phenol resin, melamine resin, urea resin, unsaturated polyester, fluorinated resin, polyamide such as polyimide, polyamide-imide, polyether-imide and the like, polyester such as polybutylene terephthalate, polyethylene terephthalate and the like, polyphenylene sulfide, fully aromatic polyester, polysulfone, liquid crystal polymer, polyether sulfone, polycarbonate, maleimide modified resin, ABS resin, AAS (acrylonitrile-acrylic rubber-styrene) resin, AES (acrylonitrile-ethylene-propylene-diene rubber-styrene) resin and the like. It is preferred that the spherical silica powder of the present invention and it mixed power is used by formulating particularly in polyethylene (PE) or polypropylene (PP).

The ratio of the spherical silica powder and the mixed powder in the resin is appropriately determined according to targeted physical properties such as a dielectric constant and a dielectric tangent and the like. For example, the amount of the resin to be used is appropriately selected within a range of 10-10000 parts by mass with respect to 100 parts by mass of the spherical silica powder. Assuming that the density of the resin is 1.2 g/cm³, the volume ratio of the resin is appropriately selected within the range of 1.8-94.3%.

The spherical silica powder of the present embodiment may be formulated into a resin to reduce a dielectric tangent of a resin sheet after formulating the powder. In addition, the resin sheet, in which the spherical silica powder of the present embodiment is formulated, has low viscosity and good fluidity, and, therefore it is excellent in moldability.

EXAMPLES

The present invention will be described below in more detail with reference to Examples, but the present invention is not limited to these Examples.

[Raw Material Silica Powder 1]

Spherical silica (Denka Co., Ltd.: FB-5D, Specific surface area 2.4 m²/g) was evaluated as it was without heat treatment in the same manner as in Example 1 described later. Evaluation results are listed in Table 1. Additionally, the powder equivalent dielectric tangent (tan $\delta f_A$) of Raw material silica powder 1 without a dielectric tangent reduction treatment is $2.9\times10^{-3}$ when polyethylene(PE) was used and $3.0\times10^{-3}$ when polypropylene (PP) was used as a resin.

[Raw Material Silica Powder 2]

Spherical silica (Denka Co., Ltd.: SFP-30 m, Specific surface area 6.0 m²/g) was evaluated as it was without heat treatment in the same manner as in Example 1 described later. Evaluation results are listed in Table 1. Additionally, the powder equivalent dielectric tangent (tan $\delta f_A$) of Raw material silica powder 2 without a dielectric tangent reduction treatment is $1.2\times10^{-2}$.

[Raw Material Silica Powder 3]

Spherical silica (Denka Co., Ltd.: UFP-30, Specific surface area 30 m²/g) was evaluated as it was without heat treatment in the same manner as in Example 1 described later. Evaluation results are listed in Table 1. Additionally, the powder equivalent dielectric tangent (tan $\delta f_A$) of Raw material silica powder 3 without a dielectric tangent reduction treatment is $5.0\times10^{-2}$.

[Raw Material Silica Powder 4]

Spherical silica (Denka Co., Ltd.: FB-40R, Specific surface area 0.4 m²/g) was evaluated as it was without heat treatment in the same manner as in Example 1 described later. The evaluation results are shown in Table 1. Additionally, the powder equivalent dielectric tangent (tan $\delta f_A$) of Raw material silica powder 4 without a dielectric tangent reduction treatment is $3.7\times10^{-4}$.

Example 1

As raw material silica, 15 g of Raw material silica powder 1 (Denka Co., Ltd.: FB-5D, Specific surface area 2.4 m²/g) was filled in an aluminum crucible, and it was heat treated at 1000° C. for 4 hours in an electric furnace. After heat treatment, it was cooled to 200° C. in the furnace and cooled to room temperature in a desiccator (23° C.-10% RH), and it was stored in a stand pack of an aluminum pack (a PET/AL/PE laminate bag: Seisannipponsha Ltd.) until just before the respective evaluations. The evaluation results are shown in Table 2. Additionally, since the powder equivalent dielectric tangent (tan $\delta f_B$) of the spherical silica powder after heat treatment, which was measured on a 36 GHz Cavity resonator (Samtach Co., Ltd.), was $7.6\times10^{-4}$, and the powder equivalent dielectric tangent (tan $\delta f_A$) of Raw material silica powder 1 was $2.9\times10^{-3}$, B/A was calculated as 0.26.

Example 2-5

Heat treatments and evaluations were performed in the same manner as Example 1, except that the heat treatment temperature and time were set as shown in Table 2. The evaluation results are shown in Table 2.

Example 6

As raw material silica, 15 g of Raw material silica powder 1 (Denka Co., Ltd.: FB-5D, Specific surface area 2.4 m²/g) was filled in an aluminum crucible, and it was heat treated at 1000° C. for 4 hours in an electric furnace. After heat treatment, it was cooled to 200° C. in the furnace and cooled to room temperature in a desiccator (23° C.-10% RH), and 1 part by mass of hexamethyldisilazane (Shinetsu Slicone Co., Ltd., SZ-31; HMDS) was added to 100 parts by mass of the collected sample. The added powder was mixed with a vibration mixer produced by Resodyn Corporation, and dried at 200° C.-4 hours, and it was stored in an aluminum pack in the same matter as Example 1 until just before the respective evaluations. The evaluations were performed in the same manner as Example 1. The evaluation results are shown in Table 2.

Example 7

Heat treatments and evaluations were performed in the same manner as Example 1, except that the raw material silica was changed to Raw material silica powder 2 (Denka Co., Ltd.: SFP-30 m, Specific surface area 6.0 m²/g). The evaluation results are shown in Table 2.

Example 8

Heat treatments and evaluations were performed in the same manner as Example 1, except that the raw material silica was changed to Raw material silica powder 3 (Denka Co., Ltd.: UFP-30, Specific surface area 30 m²/g). The evaluation results are shown in Table 2.

Example 9

Heat treatments and evaluations were performed in the same manner as Example 1, except that a polypropylene powder was used for evaluations of dielectric properties. The evaluation results are shown in Table 2.

Comparative Example 1-3

Heat treatments and evaluations were performed in the same manner as Example 1, except that the heat treatment temperature and time were set as shown in Table 3. The evaluation results are shown in Table 3.

Comparative Example 4

Heat treatments and evaluations were performed in the same manner as Example 1, except that the raw material silica was changed to Raw material silica powder 4 (Denka Co., Ltd.: FB-40R, Specific surface area 0.4 m²/g). The evaluation results are shown in Table 3.

Comparative Example 5

Heat treatments and evaluations were performed in the same manner as Example 1, except that a polypropylene powder was used for evaluations of dielectric properties, and the temperature in the electric furnace was set to 200° C. and the heating time was set to 8 hours. The evaluation results are shown in Table 3.

Example 10

The spherical silica powder after heat treatment according to Example 7 was placed in an aluminum pack similar to Example 1 {a PET/ALPE laminate bag: Seisannipponsha Ltd.: the moisture permeability is 0.1 (g/m²·24 h) or lower} and it was placed in a high temperature-high humidity chamber adjusted to 40° C.-75% RH, and dielectric properties were evaluated after 3 months. The evaluation results are shown in Table 4.

Example 11

The spherical silica powder after heat treatment according to Example 7 was placed in a PE bag with zipper {UNI-PACK 0.08 Type: Seisannipponsha Ltd.: The moisture permeability is 15.2 (g/m²·24 h)} and it was placed in a high temperature-high humidity chamber adjusted to 40° C.-75% RH, and dielectric properties were evaluated after 3 months. The evaluation results are shown in Table 4.

Properties of the respective samples were evaluated by the following methods. The respective evaluation results are shown in Tables 1-5.

[Evaluations for Dielectric Properties]

Spherical silica and, polyethylene (PE) powder (FLO-THENE UF-205, produced by Sumitomo Seika Chemicals Co., Ltd.) or polypropylene (PP) powder (FLO-BLEN QB200, produced by Sumitomo Seika Chemicals Co., Ltd.) were weighed so that the filling amount of the spherical silica after heat treatment was 40 volume % and mixed with a vibration mixer produced by Resodyn Corporation (Acceleration 60 g, Processing time 2 minutes). The obtained mixed powder was weighed by a given volume integral (so that the thickness was about 0.3 mm), placed in a mold having a diameter of 3 cm, and made into a sheet with a thermal press machine (IMC-1674-Tyape A, produced by Imoto Machinery Co., Ltd.) at 140° C., 10 MPa, for 15 minutes in the case of PE; 190° C., 10 MPa, for 60 minutes in the case of PP, to form evaluation specimens. The thickness of the evaluation specimen sheet was about 0.3 mm and its shape and size do not affect the evaluation results as far as it could be mounted on measuring equipment, but it was around 1-3 cm square.

For measurement of dielectric properties, a 36 GHz Cavity resonator (Samtach Co., Ltd.) was connected with a vector network analyzer (85107, Keysight Technologies, Inc.), a specimen (1.5 cm square, Thickness 0.3 mm) was set so that a hole having 10 mm, made on a resonator was closed to measure a resonance frequency (f0) and an unload Q value (Qu). The specimen was rotated for each measurement, and the measurement was repeated 5 times in the same manner, and the averages of the obtained f0 and Qu were defined as the measured values. An analyzing software (a software provided from Samtech Co., Ltd.) was used to calculate a dielectric constant based on f0 and a dielectric tangent (tan δc) based on Qu. The measurement temperature was 20° C. and the humidity was 60% RH.

By use of the obtained tan δc, a filler (silica powder) equivalent dielectric tangent (tan δf) was calculated following the below Formula (I).

[Numerical formula 4]

$$\log(\tan\delta c) = Vf \cdot \log(\tan\delta f) + (1 - Vf) \cdot \log(\tan\delta r) \quad \text{Formula (I)}$$

wherein, in Formula (I), each of the symbols has the following meanings:

Vf; a volume fraction of the spherical silica powder in the sheet tan δr; a dielectric tangent of a resin sheet (without filler formulation)

The dielectric tangents (tan δr) for a PE resin sheet and a PP resin sheet without filler formulation were $3.4\times10^{-4}$ and $2.1\times10^{-4}$, respectively.

Additionally, only for Raw material silica powder 1, dielectric properties were evaluated with a 40 GHz Split Cylinder resonator (Kanto Electronic Application and Development Inc.) and a Balanced-type Circular Disk resonator (Keysight Technologies, Inc.) in the same manner. Specimens for dielectric property evaluations were made in the same manner as the measurements with a 36 GHz Cavity resonator.

In a dielectric property measurement method with a 40 GHz Split Cylinder resonator, a specimen (Diameter 3 cm, Thickness 0.2 mm) was set on a resonator to measure a resonant frequency (f0), an unload Q value (Qu). The sample was rotated for each measurement, and the measurement was repeated 5 times in the same manner, and the averages of the obtained f0 and Qu were defined as the measured values. An analyzing software was used to calculate a dielectric constant based on f0 and a dielectric tangent (tan δc) based on Qu. The measurement temperature was 26° C. and the humidity was 60% RH.

In a dielectric property measurement method with a Balanced-type Circular Disk resonator, two identical specimens (Diameter 3 cm, Thickness 0.5 mm) were prepared and a copper foil was put in between them and it was set in the resonator. A resonant frequency (f0), and an unload Q value (Qu) of the peak appearing within 35-40 GHz were measured. An analyzing software was used to calculate a dielectric constant based on f0 and a dielectric tangent (tan δc) based on Qu. The measurement temperature was 25° C. and the humidity was 50% RH.

The values for the dielectric constant and the dielectric tangent measured with 3 types of measurement methods are summarized in Table 5.

[Specific Surface Area]

In a cell for measurement, was filled 1 g of a sample, a specific surface area was measured (a single point BET method) with a full-automatic specific surface area measuring device: Macsorb HM model-1201 produced by Mountech Co., Ltd. The degassing condition was 200° C.-10 minutes. An adsorbed gas was nitrogen.

[Average Circularity]

After fixing power on a sample stage with a carbon tape, osmium was coated and an image of 280×1024 pixels, taken with a scanning electron microscope (JEOL Ltd., JSM-7001F SHL) at a magnitude of 500-50000 was downloaded in a personal computer. From this image, the projected area (S) of the particle (a powder particle) and the projected perimeter (L) of the particle were calculated with an image analyzer (Nippon Roper Ltd., Image-Pro Premier Ver. 9.3) and, then, circularity was calculated by the below Formula (III). Circularity was calculated for 200 arbitrary particles and their average value was defined as the average circularity.

[Numerical formula 5]

$$\text{Circularity} = 4\pi S/L^2 \qquad \text{Formula (III)}$$

[Density]

In a sample cell for measurement, was placed 1.2 g of powder, a dry-type density meter (Shimadzu Corporation, Accupyc II 1340) was used for measurement by a gas (helium) substitution method.

TABLE 1

|  | Unit | Raw material silica powder 1 | Raw material silica powder 1 | Raw material silica powder 2 | Raw material silica powder 3 | Raw material silica powder 4 |
|---|---|---|---|---|---|---|
| Type of Raw material silica powder | — | FB-5D | FB-5D | SFP-30M | UFP-30 | FB-40R |
| Heating temperature | ° C. | Untreated | Untreated | Untreated | Untreated | Untreated |
| Heating time | h |  |  |  |  |  |
| Surface treatment | — |  |  |  |  |  |
| Average circularity | — | 0.95 | 0.95 | 0.96 | 0.96 | 0.90 |
| Density | g/m$^3$ | 2.2 | 2.2 | 2.3 | 2.2 | 2.3 |
| Specific surface area | m$^2$/g | 2.4 | 2.4 | 6.0 | 30 | 0.4 |
| Resin | — | PE | PP | PE | PE | PE |
| Dielectric constant of Resin sheet | — | 2.8 | 3.0 | 2.8 | 2.8 | 2.7 |
| Dielectric tangent of Resin sheet (tan δ $c_a$) (a) | — | 8.0E−04 | 6.1E−04 | 1.4E−03 | 2.5E−03 | 3.5E−04 |
| Silica powder equivalent dielectric constant | — | 4.0 | 3.9 | 4.0 | 3.9 | 3.7 |
| Dielectric tangent of Silica powder (tan δ $f_A$) (A) | — | 2.9E−03 | 3.0E−03 | 1.2E−02 | 5.0E−02 | 3.7E−04 |

TABLE 2

|  | Unit | Example 1 | Example 2 | Example 3 | Example 4 | Example 5 | Example 6 | Example 7 | Example 8 | Example 9 |
|---|---|---|---|---|---|---|---|---|---|---|
| Type of Raw material silica powder | — | FB-5D | FB-5D | FB-5D | FB-5D | FB-5D | FB-5D | SFP-30M | UFP-30 | FB-5D |
| Heating temperature | ° C. | 1000 | 600 | 1000 | 1000 | 1000 | 1000 | 1000 | 1000 | 1000 |
| Heating time | h | 4 | 8 | 12 | 2 | 1 | 4 | 4 | 4 | 4 |
| Surface treatment | — | — | — | — | — | — | HMDS | — | — | — |
| Average circularity | — | 0.95 | 0.95 | 0.95 | 0.95 | 0.95 | 0.95 | 0.96 | 0.96 | 0.95 |
| Density | g/m$^3$ | 2.2 | 2.3 | 2.2 | 2.2 | 2.2 | 2.2 | 2.3 | 2.2 | 2.2 |
| Specific surface area | m$^2$/g | 2.3 | 2.4 | 2.3 | 2.3 | 2.3 | 2.3 | 5.9 | 29 | 2.3 |
| Resin | — | PE | PE | PE | PE | PE | PE | PE | PE | PP |
| Dielectric constant of Resin sheet | — | 2.8 | 2.8 | 2.8 | 2.8 | 2.8 | 2.8 | 2.8 | 2.8 | 3.0 |
| Dielectric tangent of Resin sheet (tan δ $c_b$) (b) | — | 4.7E−04 | 6.2E−04 | 4.8E−04 | 5.5E−04 | 5.5E−04 | 4.5E−04 | 7.6E−04 | 1.2E−03 | 3.7E−04 |
| Silica powder equivalent dielectric constant | — | 4.0 | 4.0 | 3.9 | 3.8 | 3.8 | 3.9 | 4.0 | 4.1 | 3.9 |
| Silica powder equivalent Dielectric tangent (tan δ $f_B$) (B) | — | 7.6E−04 | 1.5E−03 | 8.1E−04 | 1.1E−03 | 1.1E−03 | 6.9E−04 | 2.5E−03 | 8.0E−03 | 8.5E−04 |
| B/A |  | 0.26 | 0.52 | 0.28 | 0.38 | 0.38 | 0.24 | 0.21 | 0.16 | 0.29 |
| Recuction rate in Dielectric constant of Resin sheet | % | 41 | 22 | 40 | 41 | 31 | 44 | 46 | 52 | 39 |

TABLE 3

|  | Unit | Comparative example 1 | Comparative example 2 | Comparative example 3 | Comparative example 4 | Comparative example 5 |
|---|---|---|---|---|---|---|
| Type of Raw material silica powder | — | FD-5D | FD-5D | FD-5D | FB-40R | FD-5D |
| Heating temperature | °C. | 200 | 400 | 1000 | 1000 | 200 |
| Heating time | h | 8 | 4 | 0.5 | 4 | 8 |
| Surface treatment | — | — | — | — | — | — |
| Average circularity | — | 0.95 | 0.95 | 0.95 | 0.90 | 0.95 |
| Density | g/m³ | 2.2 | 2.2 | 2.2 | 2.3 | 2.3 |
| Specific surface area | m²/g | 2.4 | 2.4 | 2.4 | 0.4 | 2.4 |
| Resin | — | PE | PE | PE | PE | PP |
| Dielectric constant of Resin sheet | — | 2.8 | 2.8 | 2.8 | 2.8 | 3.0 |
| Dielectric tangent of Resin sheet (tan δ $c_b$) (b) | — | 7.6E–04 | 7.2E–04 | 7.2E–04 | 3.3E–04 | 5.8E–04 |
| Silica powder equivalent dielectric constant | — | 4.0 | 4.0 | 4.0 | 4.0 | 3.9 |
| Silica powder equivalent Dielectric tangent (tan δ $f_B$) (B) | — | 2.5E–03 | 2.2E–03 | 2.2E–03 | 3.2E–04 | 2.7E–03 |
| B/A | | 0.86 | 0.76 | 0.76 | 0.86 | 0.90 |
| Recuction rate in Dielectric constant of Resin sheet | % | 5 | 10 | 10 | 6 | 5 |

TABLE 4

|  | Storage period | Example 10 | Example 11 |
|---|---|---|---|
| Heat treated silica powder | | Example 7 | Example 7 |
| Storage bag | | Alumimum Pack | PE bag |
| Silica powder equivalent Dielectric tangent (tan δ $f_B$) (B) | Initial | 2.5E–03 | 2.5E–03 |
| | 3 months later | 2.5E–03 | 2.8E–03 |

TABLE 5

|  | Raw material powder 1 | | |
|---|---|---|---|
| Dielectric properties evaluation method | 36 GHz Cavity resonator | 40 GHz Split cylinder resonator | Blanced-type Circular disk resonator |
| Dielectric constant of Resin sheet | 2.8 | 2.8 | 2.8 |
| Dielectric tangent of Resin sheet (tan δ $c_b$) (b) | 8.0E–04 | 7.8E–04 | 8.1E–04 |

As a result, the resin sheets containing the spherical silica powder of Examples 1-11 show a lower dielectric tangent than the resin sheets containing the spherical silica powder of Comparative examples 1-5.

INDUSTRIAL APPLICABILITY

The spherical silica powder of the present invention is available as filler capable of reducing a dielectric tangent of a substrate when it is filled in a resin material.

The invention claimed is:

1. Spherical fused silica powder that has been subjected to a dielectric tangent reduction treatment comprising heat treating a raw material spherical fused silica powder having a specific surface area of 1-30 m²/g at a temperature of 500-1100° C. and for a predetermined time in which heating temperature (° C.)×heating time (h) is 1000-26400° C.·h, the spherical fused silica powder having:

a dielectric tangent ratio B/A of 0.70 or lower, wherein "A" represents a dielectric tangent (tan $\delta f_A$) of the spherical fused silica powder before the dielectric tangent reduction treatment and "B" represents a dielectric tangent (tan $\delta f_B$) of the spherical fused silica powder after the dielectric tangent reduction treatment, the dielectric tangent (tan $\delta f_A$, tan $\delta f_B$) of the spherical fused silica powder before and after the dielectric tangent reduction treatment being measured with a resonator method at a frequency of 35-40 GHz, a temperature of 20° C., and a humidity of 60% RH after formulating the spherical fused silica powder in a resin and thereafter molding the formulation into a sheet, and being calculated from the following Formula (I):

$$\log(\tan\delta c) = Vf \cdot \log(\tan\delta f) + (1 - Vf) \cdot \log(\tan\delta r) \quad \text{Formula (I)}$$

wherein, in Formula (I), the symbols have the following meanings:
tan δc: dielectric tangent of the sheet;
Vf: a volume fraction of the spherical fused silica powder in the sheet;
tan δr: a dielectric tangent of a resin sheet without the spherical fused silica powder therein;
and a specific surface area of 1-30 m²/g.

2. The spherical fused silica powder of claim 1, wherein the fused spherical silica powder has an average circularity of 0.85 or higher.

3. The spherical fused silica powder of claim 1, wherein the fused spherical silica powder is surface treated with a surface treatment agent.

4. The spherical fused silica powder of claim 1, wherein the spherical fused silica powder has a density of 1.8-2.4 g/cm³.

5. An article comprising the spherical fused silica powder of claim 1 and a moisture-proof bag storing the fused spherical silica powder, the moisture-proof bag having a permeability of 0.1 (g/m²·24h) or lower under the condition of B (Temperature 40° C.–Relative humidity 90%) defined by JIS Z 0208-1976.

6. A resin sheet comprising the spherical fused silica powder of claim 1.

7. A method for storing the spherical fused silica powder of claim 1, comprising a step of storing the spherical fused silica powder in a moisture-proof bag with a permeability of 0.1 (g/m²·24h) or lower under the condition of B (Temperature 40° C.–Relative humidity 90%) defined by JIS Z 0208-1976.

* * * * *